United States Patent
Dietz

[15] 3,678,836
[45] July 25, 1972

[54] RANGING AND FOCUSING METHOD AND APPARATUS

[72] Inventor: Milton S. Dietz, Lexington, Mass.
[73] Assignee: Polaroid Corporation, Cambridge, Mass.
[22] Filed: June 29, 1970
[21] Appl. No.: 50,635

[52] U.S. Cl. ................................. 95/45, 33/71, 33/206 DL
[51] Int. Cl. ............................................... G03b 13/20
[58] Field of Search .................. 33/71, 206 DL, 207; 95/45

[56] References Cited

UNITED STATES PATENTS

| 3,538,830 | 11/1970 | Henriksen | 95/45 X |
| 884,955 | 4/1908 | Riches | 33/71 |
| 2,023,748 | 12/1935 | Shipley | 33/206 DL |
| 2,286,810 | 4/1940 | Ingels | 33/207 X |
| 2,532,104 | 11/1950 | King | 33/206 DL X |

FOREIGN PATENTS OR APPLICATIONS 557,593  6/1957  Belgium.............................33/206 DL Primary Examiner—Samuel S. Matthews
Assistant Examiner—Michael Harris
Attorney—Brown and Mikulka, William D. Roberson and Michael Bard

[57] ABSTRACT

A fluid-filled chamber 24 connected to the housing of the camera and is provided with a bubble 28, globule, or the like, moveably disposed therein. The viewfinder of the camera is provided with a fiducial mark which is brought into alignment with that portion of the subject intersecting the plane on which the photographer is standing. This action will cause a tilting of the camera from a horizontal position, effecting movement of the bubble, globule, or the like, with respect to a reference. The distance between the bubble, globule, or the like, and such reference is varied by adjusting the focus of the camera such that the camera will be properly focused when the reference and the bubble, globule, or the like, are coincident. In one embodiment, the reference line is mounted in the chamber and a cam 16, mounted on the lens, pivots the chamber as the lens is focused. In another embodiment, the cam is replaced with a spiral reference mark so that the reference mark moves as the lens is focused. In another embodiment, for a reference point, plural contacts are positioned partially within the chamber and an electrically conductive globule is in the chamber. When the globule touches both contacts, a circuit is closed and a small light in the viewfinder is energized to indicate correct focus.

46 Claims, 14 Drawing Figures

INVENTOR.
MILTON S. DIETZ

3,678,836

RANGING AND FOCUSING METHOD AND APPARATUS

BACKGROUND OF THE INVENTION

In the use of cameras provided with adjustable means for focusing the camera for subjects at different distances therefrom, considerable difficulty is experienced in determining the correct distance of the subject, which frequently results in the spoiling of the negative through improper focusing.

Typical of the prior art approach to such problems is the gravity actuated pendulum technique disclosed in U. S. Pat. No. 1,501,461, issued to A. Kurnick on July 15, 1924. In the Kurnick device, a pendulum is pivotally mounted within a housing which is secured to the frame of a camera. The camera is held in a horizontal position causing the pivoted pendulum to be vertical. Subsequently, the camera is pointed toward the baseline of a subject to be photographed (that is, the intersection of such subject with the horizontal plane on which the photographer is standing) causing the pendulum to move relative to its housing (which is provided with suitable indicia) by an amount dependent on the angle through which the camera is tilted with respect to the horizontal position.

If it is assumed that the camera is held adjacent a portion of the photographer's anatomy such as, for example, his waist, and the vertical distance therefrom to the base plane is known, it should be apparent that by the simple process of triangulation, the horizontal distance between the subject and the camera will be functionally related to the angle swept by the pendulum with respect to its housing. Accordingly, by suitably spacing the indicia on the housing of the pendulum, the position of the pendulum with respect to its housing may be made to correspond to the distance to the subject to be photographed.

Of course, the very nature of an arrangement such as taught by Kurnick leads to unnecessary mechanical complications and attendant inaccuracies caused, for example, by friction in that the pendulum must be pivoted.

It should be apparent that the differences in the height at which the camera might be held will differ with the height of various individuals, but such differences in height will, under ordinary conditions, be confined to variations not over six inches above or below a certain mean position, which variations would make such a slight difference in the angular measurements that the desired measurements may be obtained with sufficient accuracy to enable the lens to be focused within the limits required for a clear, sharp negative.

Attempts to remedy some of the inaccuracies and unnecessary structure attendant in the use of a pendulum type of gravity actuated rangefinder led to the use of devices working on the principle of the well-known spirit level. Such spirit level devices comprise a tube of transparent material having within them liquid and an air bubble. The tube is curved and is set within a frame and secured to some fixed portion of the camera housing as, for example, the bed. The tube is provided with scale graduations and the bubble moves with respect thereto as the camera is tilted.

Unfortunately, devices of the spirit level variety have heretofore suffered from inherent problems relating to range and sensitivity. By way of example, if the tube is given a very small radius of curvature it will have a wide range in that the tilting of the camera through a large angle will not cause the bubble to completely traverse the tube. Along with this wide range, however, will be a very low sensitivity, in that the bubble will not move enough to give an accurate indication of small angles of tilt.

If the radius of curvature of the tube is made very large, that is, as the tube approaches a right circular cylinder, the sensitivity increases markedly, but the range becomes extremely limited in that very small angles of tilt will cause the bubble to completely traverse the tube.

Another problem inherent in prior art devices of the gravity actuated rangefinding variety is the inability of the photographer to simultaneously monitor the focus setting of the camera whilst viewing the subject to ensure that the lens is set for the proper range.

In response to the last-mentioned difficulty, the invention which is the subject matter of U. S. Patent application, Ser. No. 717,813, filed Apr. 1, 1968 by Bruce K. Johnson et al., was developed. The Johnson et al. invention provides indicia-imaging means for incorporation in relatively inexpensive cameras having viewfinders of the type comprising a front window through which light enters a viewfinder and a rear window through which the user views the scene to be photographed.

The viewfinder may be mounted on the top of the camera above and displaced a substantial distance from the lens and surrounding lens bezel at the end of an enclosed light path between the lens and the film plane.

In this embodiment, the lens bezel has certain markings thereon, in particular, a distance scale which scale is moveable with respect to an index position as the lens is focused. An image of the scale on the lens bezel is presented in or beside the field of view of the viewfinder and serves as a reminder to the user of the distance at which the lens is focused. If the setting is obviously in error, this will be apparent to the photographer and the proper correction can be made before the camera's shutter is released.

The Johnson et al device utilizes a periscope-like system including a pair of reflectors to direct the scale image through a path to a scale image refracting portion comprising a surface which is formed on the front surface of one of the lens elements of the viewfinder which projects the reflected image of the lens bezel scale so that the user sees an image of the scale beside or in the scene image.

In view of the foregoing, it should be apparent that prior art devices of the type described for use with relatively inexpensive cameras have enabled the operator or photographer to either determine the range of a remote subject or to monitor the focus setting of the camera so that it may be compared with the range ascertained. Attempts at coupling the rangefinder to the lens focus adjusting device and to the viewfinder mechanism necessarily entailed expensive and complicated mechanical and optical structures.

SUMMARY OF THE INVENTION

The subject invention provides a relatively simple gravity actuated mechanism for simultaneously viewing a remote subject and automatically focusing the lens of a camera with respect to the range thereof.

In one of its embodiments, the instant invention employs a focusing ring which is rotatably secured to the camera housing for adjusting the focus of the lens. A gravity actuated device of the spirit level variety is hinged to the camera housing above the focusing ring and is provided with a reference mark which, when the bubble of the spirit level is coincident therewith, indicates that the camera is horizontal. A cam is secured to said focusing ring concentric therewith and in engagement with one end portion of said spirit level whereby the inclination of the spirit level may be adjusted by rotation of the focusing ring and the cam connected thereto.

A viewfinder is connected to the camera housing at a point remote from the spirit level and a periscope-like system including two reflectors is secured to said housing above said spirit level whereby the image of same may be reflected to a portion of the viewfinder. The viewfinder is provided with a fiducial mark which may comprise a horizontal line and which is aligned with the intersection of a subject with the base plane upon which the photographer is standing. In the case of a standing human subject, such fiducial mark is aligned with the subject's feet and the camera, which is initially held horizontally at eye level, is caused to tilt through an angle dependent on the range of the subject resulting in a displacement of the bubble in the spirit level from its reference mark. The cam is suitably shaped such that rotation of the focusing ring to establish coincidence between the bubble of the spirit level and the reference mark will properly focus the lens.

The housing of the spirit level may be provided with a very large radius of curvature so as to establish great sensitivity whereby small tilt angles will cause the bubble to completely traverse the spirit level housing. However, since the displacement of the bubble from the reference mark is not being measured, but, rather, an indirect measurement is being made of the angle through which the spirit level housing must be pivoted to return the bubble to the reference mark, the range of the device is not compromised.

In a variant of the forementioned embodiment, the spirit level is replaced with a fluid-filled chamber having a small solid ball disposed therein. This variant operates in essentially the same manner as the spirit level embodiment with the exception that while the bubble will always seek the highest point in the spirit level housing, the ball will always seek the lowest point in the fluid-filled chamber. Thus, it is necessary that the curvature of the fluid-filled chamber be reversed from that of the spirit level housing.

In another embodiment of the present invention, the spirit level device aforesaid is fixed to the camera housing and the focusing ring is provided with a bezel surface having a spiral-shape reference line about the periphery thereof. The spirit level housing is transparent and the bubble therein as well as said reference line are visible in the viewfinder via the periscope-like system described above.

In this embodiment, the fiducial mark in the viewfinder may be lined with the feet of a standing subject, as described supra, whereupon the bubble will be displaced within the spirit level housing from its initial position. The focusing ring is then rotated until the spiral reference line is seen to coincide with the bubble as viewed in the viewfinder. The spiral reference line is of a pitch which varies as a function of the range of the subject. Thus, effecting coincidence between the bubble of the spirit level device and said spiral reference line will properly focus the lens of the camera for the range of the subject.

As in the previous embodiment, the fixed spirit level of the present embodiment can be replaced with a fluid-filled chamber having a small solid ball therein. In resorting to this variant, it is necessary to reverse both the curved surface of the spirit level so that the ball may move therealong and the direction of the spiral reference line, i.e., from right-hand to left-hand or vice versa.

In still another embodiment of the invention, we again find a hinged fluid-filled chamber similar to that described in connection with the solid ball variant of the hinged spirit level embodiment, supra. In this embodiment, the solid ball is replaced with a globule of electrically conductive material as, for example, a globule of mercury. Additionally, a lamp is positioned in the optical path of the viewfinder and is serially connected through a power supply to a pair of contacts which are disposed partially within the fluid-filled chamber to provide a reference.

The camera is aimed and tilted as aforesaid causing the globule to move away from the contacts. Subsequently, the focus ring is rotated carrying with it a cam surface which pivots the fluid-filled chamber causing the globule to approach the electrical contacts. When the globule reaches the electrical contacts, it closes the circuit causing the lamp to light. In this embodiment the cam is of such shape that the remote subject will be properly focused when the globule is coincident with the electrical contacts and, thus, the subject will be in proper focus when the operator sees the energized lamp in the viewfinder.

In accordance with the foregoing, it is an object of this invention to provide an improved gravity responsive means for determining the range of a remote subject.

Another object of this invention is to provide an improved gravity responsive ranging device of the spirit level type having high sensitivity, extensive range, and compactness of size.

Yet another object of this invention resides in the provision of means for simultaneously viewing a remote subject and focusing the lens of a camera with respect to the range of said subject.

It is a further object of this invention to provide an improved method of accurately determining the range of a remote subject.

A still further object of this invention is to provide a method and apparatus for automatically focusing the lens of a camera with respect to a remote subject and providing an electromagnetic signal when proper focus is achieved.

It is a still further object of this invention to provide an inexpensive, simple, and accurate means for automatically and simultaneously viewing a subject and focusing the lens of a camera with respect to the range thereof.

BRIEF DESCRIPTION OF THE DRAWINGS

Other objects and many of the attendant advantages of the present invention will be better appreciated and said invention will become clearly understood with reference to the following detailed description when considered in conjunction with the accompanying drawings illustrating several embodiments of the instant invention, wherein.

DETAILED DESCRIPTION OF THE INVENTION

Figure 1:
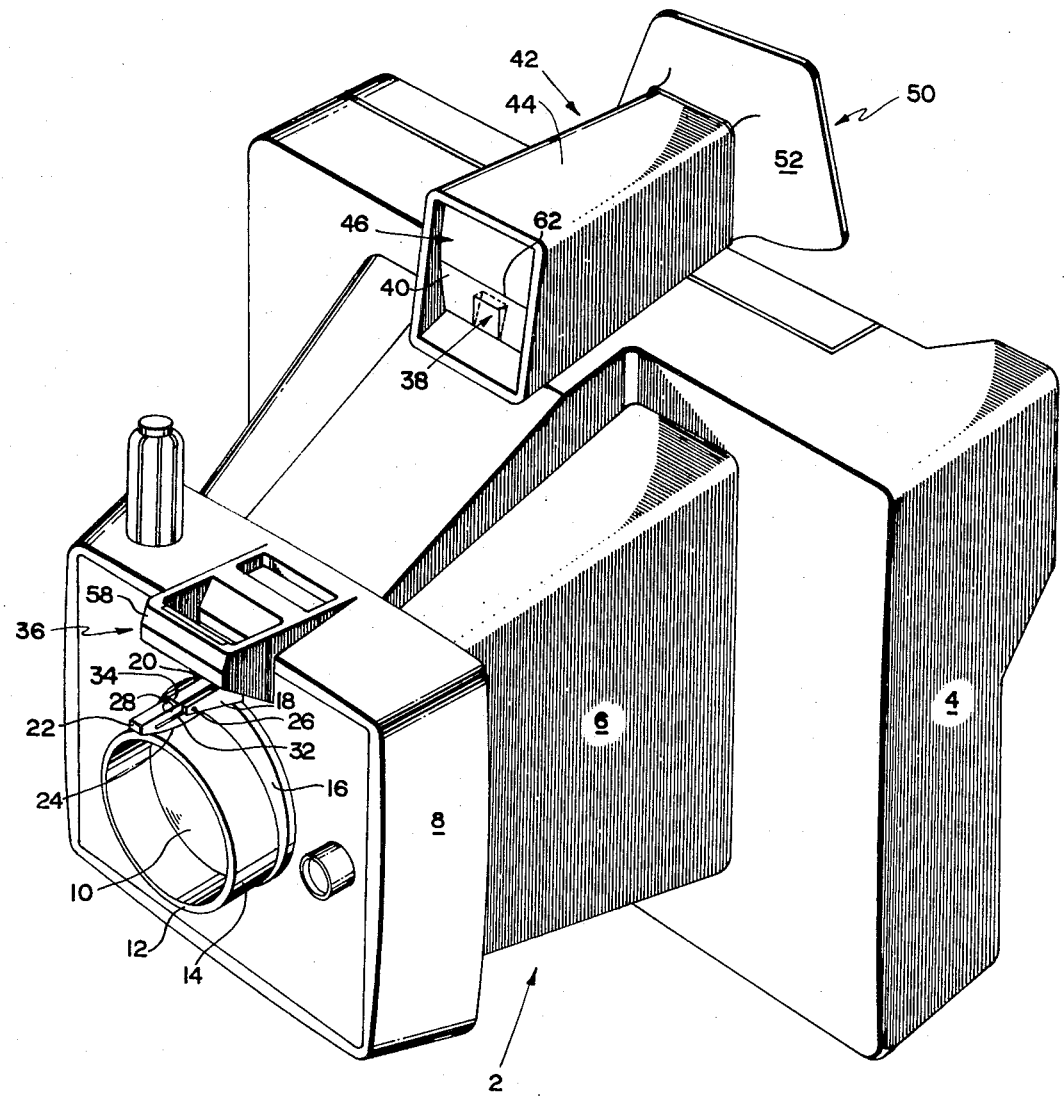
FIG. 1 provides a simplified perspective of one embodiment of the instant invention.

Referring to the drawings in more detail, and more particularly to FIG. 1, one embodiment of the subject invention is illustrated therein comprising a photographic camera shown generally at 2 having a molded plastic housing including a film chamber 4 and a protected light path 6 between the film chamber 4 and a lens housing 8 connected thereto. Centrally disposed within the lens housing 8 is a lens 10 mounted in a focusing ring 12 having a cylindrical bezel surface 14. The lens 10 is focused by manually turning the focusing ring 12. A profile cam 16 is disposed about the periphery of the bezel surface 14 and is affixed thereto concentric therewith.

A pair of spaced parallel supports 18 and 20 are fixed to the front surface of the lens housing 8 and project outward therefrom above the focusing ring 12 and profile cam 16. A transparent sealed fluid-filled chamber 22 having a curved surface 24 that is concave opening upward is pivotally hinged to said housing 8 between said supports 18 and 20, as by a pin 26.

A small sphere 28 is disposed within said fluid-filled chamber 22 and has a greater specific gravity than the fluid therein such that it continually seeks the lowest point thereof due to the force of gravity.

Figure 2:
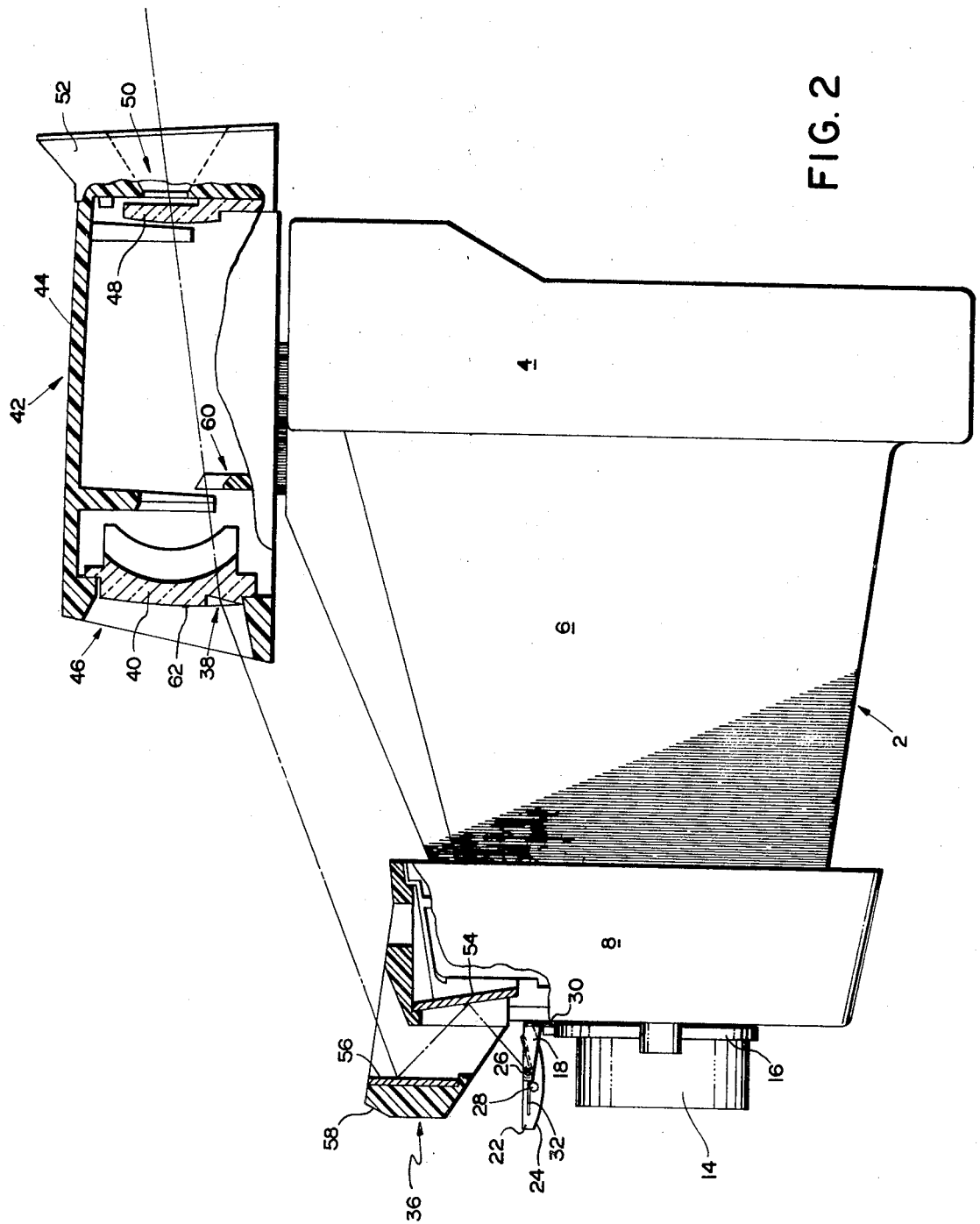
FIG. 2 provides a side elevation of the embodiment illustrated in FIG. 1, partly in section.

As best seen in FIG. 2, a cam follower assembly 30 is connected to the end portion of said chamber 22 adjacent said housing 8, between said supports 18 and 20, and is biased into engagement with the periphery of said cam 16 by means of a torsion spring 32 which is disposed about said pin 26 in engagement with said chamber 22. A reference mark 34 is provided in the top surface of the chamber 22 and is so positioned that said sphere 28 will be positioned directly thereunder when the camera 2 is held horizontally and said lens 10 is focused at infinity.

Reflecting means 36 are connected to said housing 8 above said chamber 22 and serve to reflect an image of the relative positions of said sphere 28 and reference mark 34 to a prismatic refracting portion 38 disposed on the front lens 40 of a viewfinder 42.

As best seen in FIG. 2, the viewfinder assembly 42 is mounted upon the upper portion of the camera 2. The viewfinder assembly 42 includes an enclosed tubular body portion 44 and the viewfinder lens 40 (which is negative) is positioned in the front window 46 thereof while a positive eye lens 48 is disposed within the rear window 50. A flexible rubber light shield 52 is attached upon the rearmost end portion of the viewfinder body.

Referring to the reflecting means 36 in more detail and, particularly, to FIG. 2, said reflecting means 36 is seen to include a first reflector 54 which is mounted in the lens housing 8 immediately above the bezel surface 14 and facing forward. A second reflector 56 is mounted in an extended support 58 projecting outward from the lens housing 8 and is adapted to receive a reflected image of the sphere 28 and the reference mark 34 from said first reflector 54 and direct the reflected image backwards toward the prismatic refracting portion 38 of the viewfinder lens 40.

The prismatic refracting portion 38 may be molded in the front surface of the lens 40 in accordance with the teachings of the Johnson et al. application mentioned hereinabove. Also, in order to more clearly define and outline the image of the sphere 28 and reference mark 34, framing means 60, such as is well known in the art is shown extending within the space enclosed by the viewfinder body portion 44 as taught in said Johnson et al. application.

Referring again to FIG. 1, the front lens 40 of the viewfinder 42 is seen to include a fiducial mark 62 extending horizontally thereacross. In operation, the camera may be held at eye level in an essentially horizontal position with the operator observing the subject through the viewfinder 42. The camera is then tilted away from the horizontal until the fiducial mark 62 is brought into alignment with the intersection of the subject with the base plane upon which the operator is standing.

It should be emphasized at this point that the periphery of the profile cam 16 is such that with the focusing ring 12 adjusted to a subject at infinity, and with the camera held horizontally, the sphere 28 will be directly underneath the reference mark 34 and will appear coincident therewith in the viewfinder 42.

Figure 3:
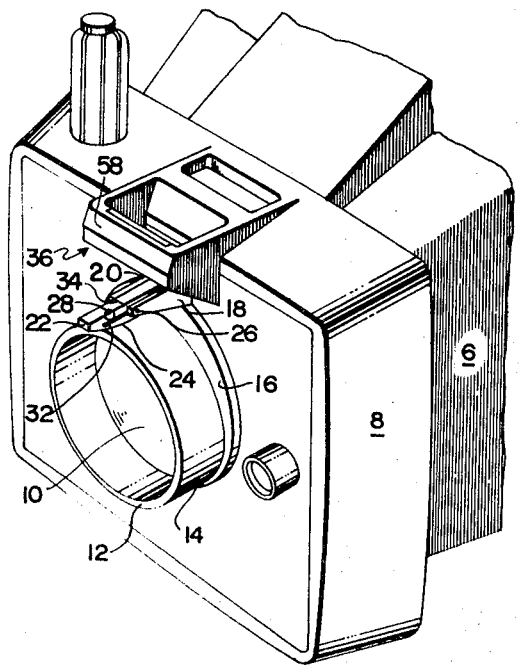
FIG. 3 provides a fragmentary perspective of the embodiment illustrated in FIG. 1.
Figure 5:
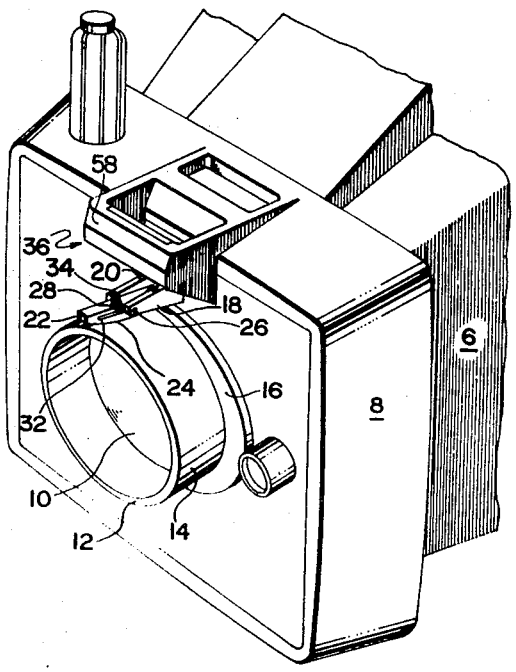
FIG. 5 provides a fragmentary perspective of the invention illustrated in FIG. 1 showing the novel focusing mechanism thereof in a different position from that of FIG. 3.

When the camera is tilted from the horizontal as aforesaid, the sphere 28 will, as best seen in FIG. 3, move to the lowermost portion of the chamber 22 and away from the reference mark 34.

Referring again to FIG. 4, the image apparent in the viewfinder 42 of the embodiment of the invention illustrated in FIGS. 1 – 6, is shown generally at 64 and is seen to include a female subject 66, the fiducial mark 62, the small sphere 28, and the reference mark 34.

Figure 4:
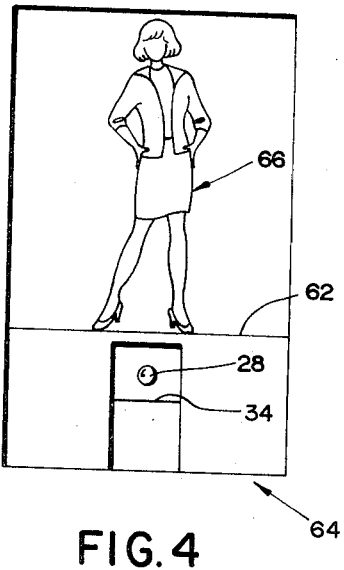
FIG. 4 provides a simplified plan of the image appearing in the viewfinder of the embodiment of FIG. 1 when the novel focusing mechanism thereof is positioned as illustrated in FIG. 3.

The image visible in FIG. 4 corresponds to the situation where the camera has been tilted away from the horizontal such that the fiducial mark 62 is in alignment with the intersection of the subject and the base plane and can be seen to just touch the feet of the subject 66. Also, inasmuch as the small sphere 28 is of such specific gravity with respect to the fluid in the chamber 22 as to always seek the lowest point therein, such sphere 28 is shown displaced upward from the reference mark 34 because in seeking the lowest position in the chamber 22 corresponding to the tilt angle of the camera, the sphere 28 has moved outward of the housing 8.

Referring again to FIG. 5, the focusing ring 12 has been rotated to adjust the focus of the lens 10 for the range of the subject 66 of FIG. 4. In the position illustrated in FIG. 5, the focusing ring 12 and the cam 16 connected thereto have been rotated a sufficient amount to level the chamber 22 and cause the sphere 28 to appear coincident with the reference mark 34 in the viewfinder image 64. The focusing adjustment, by means of the focusing ring 12, is carried out with the fiducial mark 62 maintained at the feet of the subject 66 and, as best seen in FIG. 6, when proper focus is achieved the image 64 visible in the viewfinder 42 will show the subject 66 with her feet just touching the fiducial mark 62 and with the sphere 28 coincident with the reference mark 34.

Figure 6:
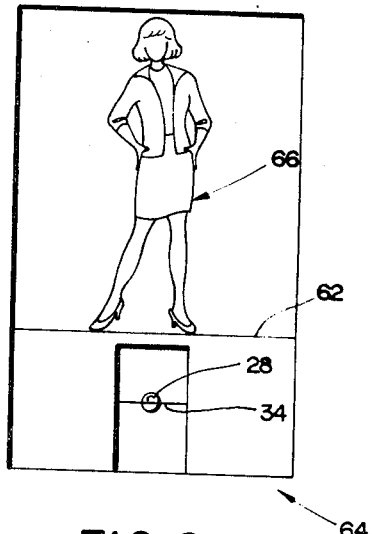
FIG. 6 provides a plan of the image visible in the viewfinder in the embodiment of FIG. 1 corresponding to the position of the novel focusing mechanism illustrated in FIG. 5.

The image of the sphere 28 and the reference mark 34 appears within a small rectangle in the lowermost portion of the image 64, in both FIGS. 4 and 6, because of the shape of the prismatic refracting portion 38 and that of the framing means 60 and reference may be had to the Johnson et al application aforesaid for a more complete explanation of this phenomenon.

Referring again to FIG. 7, another embodiment of the subject invention is illustrated which differs from the embodiments of FIGS. 1 – 6 only slightly. Accordingly, the same numerals have been used to identify those portions of the embodiment of FIG. 7 which are common to the embodiments of FIGS. 1 – 6. Those portions of the embodiment of FIG. 7 which correspond to but are different from portions of the embodiment of FIGS. 1 – 6, are identified with corresponding numbers followed by the symbol "'."

Figure 7:
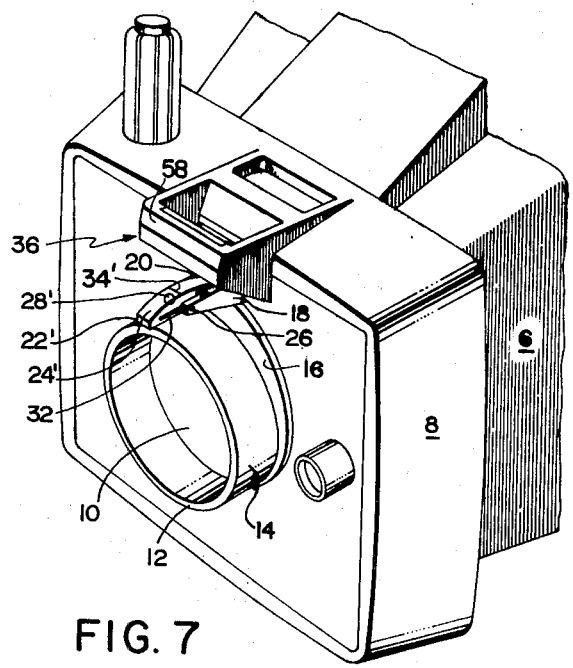
FIG. 7 provides a fragmentary perspective of another embodiment of the subject invention.

The chamber 22 of the embodiment of FIGS. 1 – 6 is replaced in the embodiment of FIG. 7 with a chamber 22' having its upper surface 24' concave, opening downward, rather than its lower surface concave, opening upward, as in the case of the embodiment of FIGS. 1 – 6. Additionally, the sphere 28 replaced with a bubble 28' and the reference mark 34 is replaced with a reference mark 34' which appears on the curved surface 24', rather than on a flat surface, as in the case of the embodiment of FIGS. 1 – 6.

The change in the curved surface 24 to that of the curved surface 24' is necessitated because of the tendency of the bubble to seek the highest point in the chamber 22' rather than to seek the lowest point as was the case with the sphere 28.

The embodiment of the invention illustrated in FIG. 7 operates in exactly the same manner as the embodiment of FIGS. 1 – 6 with the exception that when the camera is tilted to bring the fiducial mark 62 of the viewfinder 42 into alignment with the feet of the subject, the bubble 28' will appear below the reference mark 34' in the viewfinder 42 because of the tendency of the bubble 28' to seek the highest point in the chamber 22' and move toward the housing 8.

Nevertheless, rotation of the focusing ring 12 in exactly the same direction as was done in the embodiment of FIGS. 1 – 6 will effect coincidence between the bubble 28' and the reference mark 34' when the lens 10 is properly focused for the range of the subject. Also, it should be noted that the cam 16 utilized in the embodiments in FIGS. 1 – 6 may be exactly the same as that utilized in the embodiment of FIG. 7.

Figure 8:
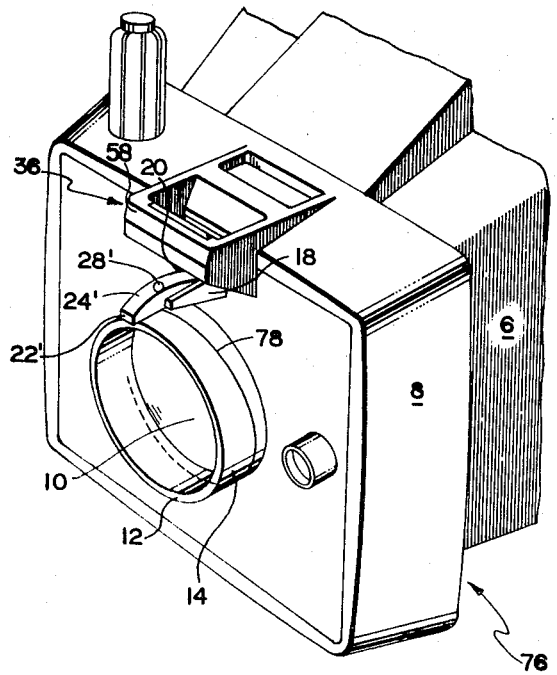
FIG. 8 provides a fragmentary perspective of a third embodiment of the subject invention.

Looking again to FIG. 8, a third embodiment of the subject invention is shown generally at 76 and differs only slightly from the embodiment of FIG. 7. Accordingly, the same numerals have been used to identify those portions of the embodiment of FIG. 8 which correspond to portions of the embodiment of FIG. 7. In the embodiment of FIG. 8, the chamber 22' is fixedly secured to the spaced parallel supports 18 and 20 and, hence, the torsion spring 32 and the pin 26 have been eliminated. Also, the embodiment of FIG. 8 does not utilize a cam 16 and there is no need for the reference mark 34'. The cam 16 and reference mark 34' of the embodiment of FIG. 7 have been replaced with a spiral reference mark 78 which is disposed about a portion of the cylindrical bezel surface 14 of the focusing ring 12. The spiral-shape reference line is so positioned that when the camera is held level, with the lens 10 focused at infinity, the bubble 28' will lie directly over a portion of the reference 78 and will appear coincident therewith in the viewfinder 42.

In operation, the embodiment of FIG. 8 is similar to that of the embodiments described hereinabove in that the camera is tilted such that the fiducial mark 62 is made coincident with the intersection of the subject with the base plane that the operator is standing on. As in the case of the embodiment of FIG. 7 the bubble 28' will be displaced from its position when the camera is horizontal and will move toward the housing 8.

The focusing ring 12 is then rotated until the spiral reference line 78 appears coincident with the bubble 28' in the viewfinder 42. When this occurs the lens 10 will be properly focused for the range of the subject. As mentioned hereinabove, the chamber 22' is transparent and, hence, the spiral reference line 78 is visible therethrough in the viewfinder 42. Also, the positioning of the spiral reference line 78 and the variance of its pitch is such that establishing coincidence between such reference line 78 and said bubble 28' will always properly focus the lens 10.

Figure 9:
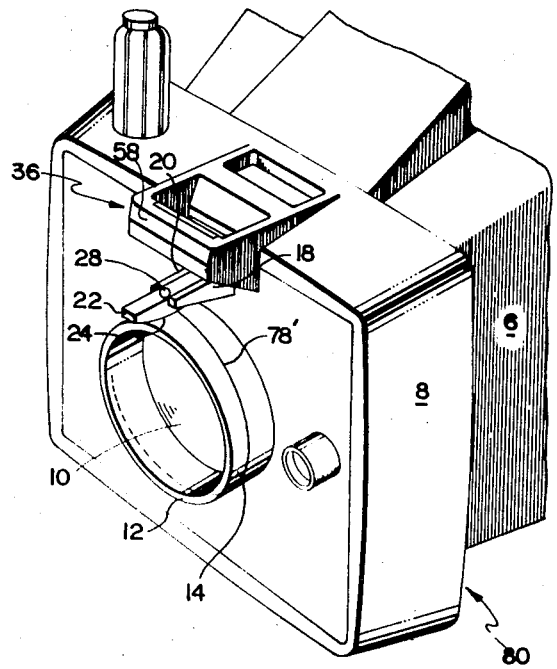
FIG. 9 provides a fragmentary perspective of a fourth embodiment of the subject invention.

Referring to FIG. 9 in more detail, a fourth embodiment of the instant invention is shown generally at 80 and bears the same relationship to the embodiment of FIGS. 1 – 6 as the embodiment of FIG. 8 bears to the embodiment of FIG. 7. Accordingly, common reference numerals have been utilized to identify common parts of the embodiments of FIGS. 1 – 6 and FIG. 9. As in the case of the embodiment of FIG. 8, the torsion spring 32 and the pin 26 have been eliminated from the embodiment of FIG. 9 and the chamber 22 is fixed to the supports 18 and 20 and extends outward of the housing 8. Also, the reference line 34 and the cam 16 have been dispensed with.

In operation, the embodiment of FIG. 9 is quite similar to that of the embodiment of FIG. 8 except that, when the camera is tilted to align the fiducial mark 62 with the intersection of the subject and the base plane, the ball 28 will seek the lowest point in the chamber 22 and move outward of the housing 8 and appear to move up, as seen in the viewfinder 42. As in the case of the embodiment of FIG. 8, a spiral reference line 78' is disposed about the bezel surface 14 and serves as the reference with respect to which the ball 28 moves in the viewfinder 42. It is apparent, however, that the spiral 78' is reversed from the spiral 78 (FIG. 8) in that looking at the front of the housing 8 and spiral 78' appears to be a righthanded spiral while the spiral 78 of FIG. 9 appears to be a lefthanded spiral. The change in the direction of the spiral 78' from that of the spiral 78 is necessary because the ball 28 moves outward of the housing 8 toward the lowest position of the chamber 22 as the camera is tilted and, hence, it is necessary that the spiral 78' be of such pitch that it, too, moves axially out from the housing 8 as the focus of the lens 10 is shifted from infinity.

As in the case of the spiral 78 of the embodiment of FIG. 8, the positioning and varying pitch of the spiral 78', of the embodiment of FIG. 9, is such that establishing coincidence between the sphere 28 and a portion of the spiral reference line 78', in the viewfinder 42, will effect proper focusing of the lens 10 for the range of the particular subject.

Figure 10:
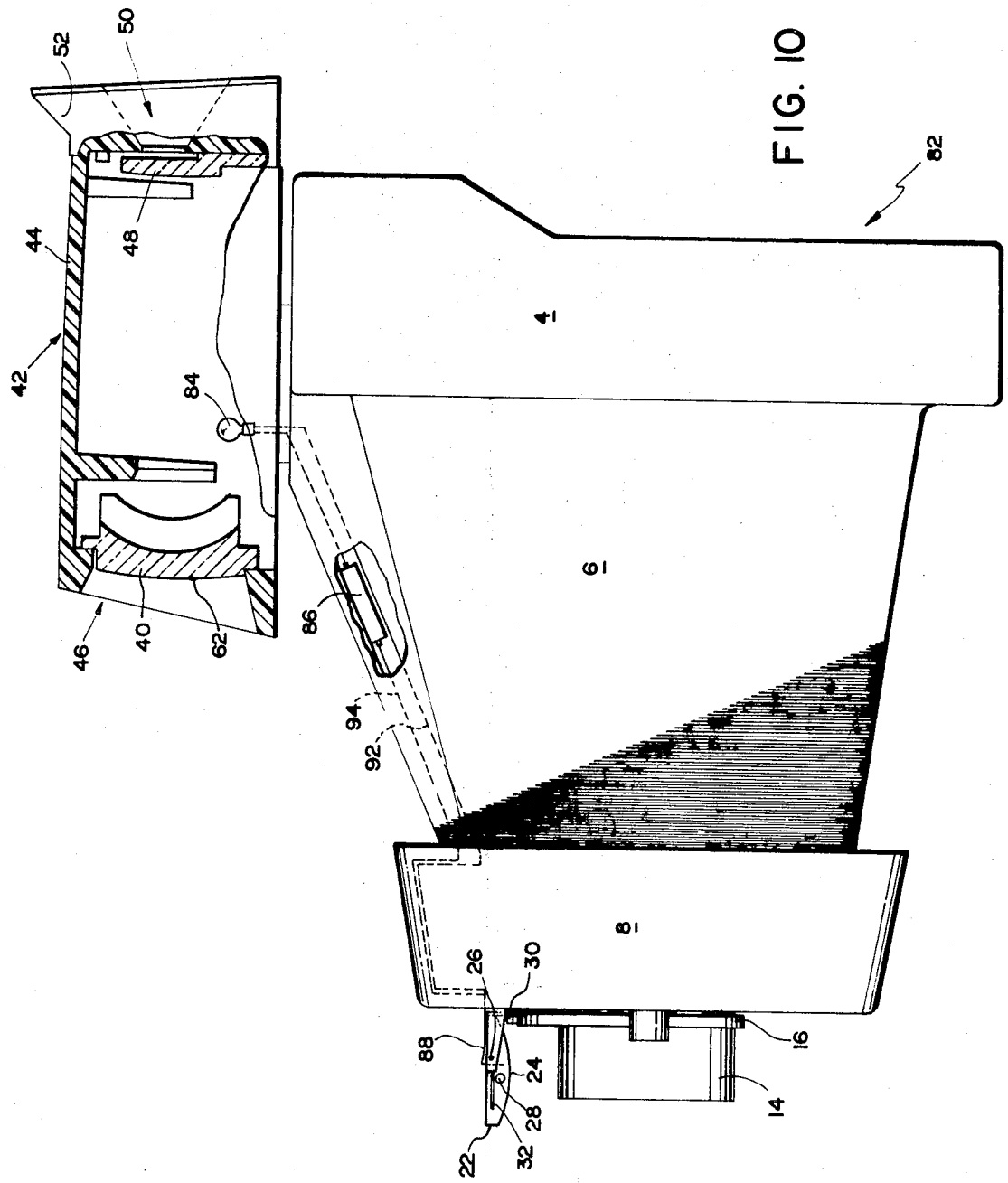
FIG. 10 provides a fragmentary side elevation of a fifth embodiment of the subject invention, partly in section.

Referring to FIG. 10 in more detail, a fifth embodiment of the invention is illustrated generally at 82 and, with the exception of several changes to be discussed infra, said fifth embodiment is essentially the same as the embodiment illustrated in FIGS. 1 – 6. Accordingly, corresponding portions of the fifth embodiment of the invention to those in the embodiments of FIGS. 1 – 6 will be identified with the same numerals.

In the embodiment of the inventions illustrated in FIGS. 10 – 14, it is seen that the reflecting means 36 of the embodiment of FIGS. 1 – 6 has been deleted and that both the framing means 60 and the prismatic refracting portion 38 both have been eliminated from the viewfinder 42. Additionally, the reference mark 34 has been eliminated from the chamber 22.

As best seen in FIG. 10, a lamp 84 is disposed within the viewfinder 42 so as to be visible in the rear window 50 thereof. The lamp 84 is serially connected through a power supply 86 to a pair of contacts 88 and 90 (best shown in FIG. 11) via conductors 92 and 94, respectively. In the embodiment of FIGS. 10 – 14, it is necessary that the sphere 28 in the chamber 22 comprise a globule of electrically conductive material, such as mercury, and that the contacts 88 and 90 extend within the chamber 22 centrally thereof so as to provide a reference and make contact with the sphere 28 when it is located at such reference.

In operation, the embodiment of FIGS. 10 – 14 is analogous to that of FIGS. 1 – 6. Initially, with the camera held at eye level and in a horizontal position, the sphere 28 will be located at the contacts 88 and 90 and will provide an electrically conductive path therebetween causing the lamp 84 to light.

If we choose the same female subject 66 illustrated in FIGS. 4 and 6 in connection with the first-described embodiment of the invention and tilt the camera so that the fiducial mark 62 just touches the feet of the subject 66, the sphere 28 will seek the lowest point in the chamber 22 and move outward of the housing 8 and away from the contacts 88 and 90 causing the lamp to turn off.

Figure 11:
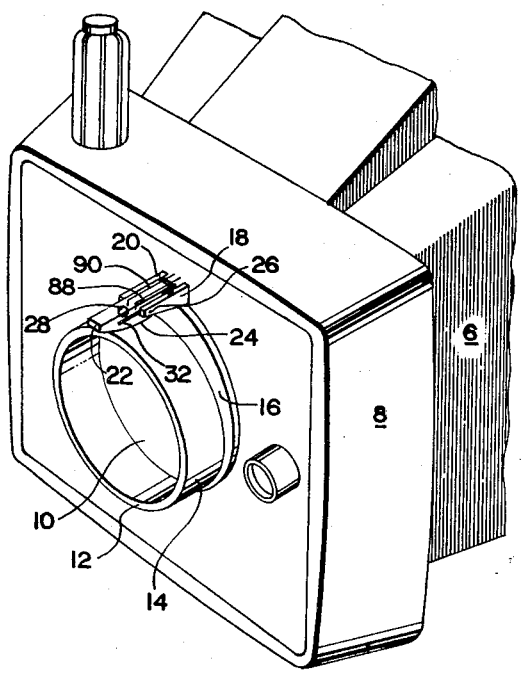
FIG. 11 provides a fragmentary perspective of the embodiment of the invention illustrated in FIG. 10.

Referring to FIG. 11 in more detail, a portion of the embodiment in FIG. 10 is illustrated for the condition where the camera is tilted so that the fiducial mark 62 in the viewfinder 42 is aligned with the feet of the subject 66 and with the lens 10 focused at infinity.

Figure 12:
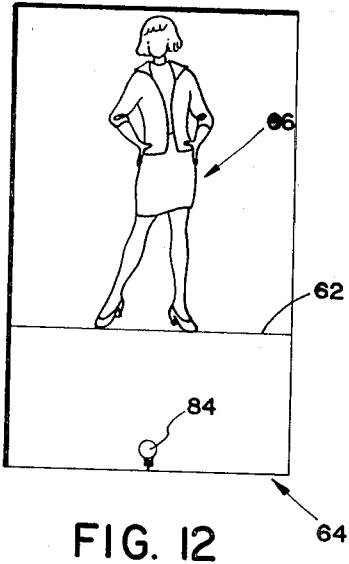
FIG. 12 provides a plan of the image visible in the viewfinder of the embodiment illustrated in FIG. 10 when the novel focusing mechanism thereof is positioned as shown in FIG. 11.

As shown in FIG. 12, the image in the viewfinder 42 when the invention is disposed as pictured in FIG. 11 shows that the operator will see the woman 66 standing just above the fiducial marks 62 and will also see the non-energized lamp 84 in the lower central portion of the image.

Figure 13:
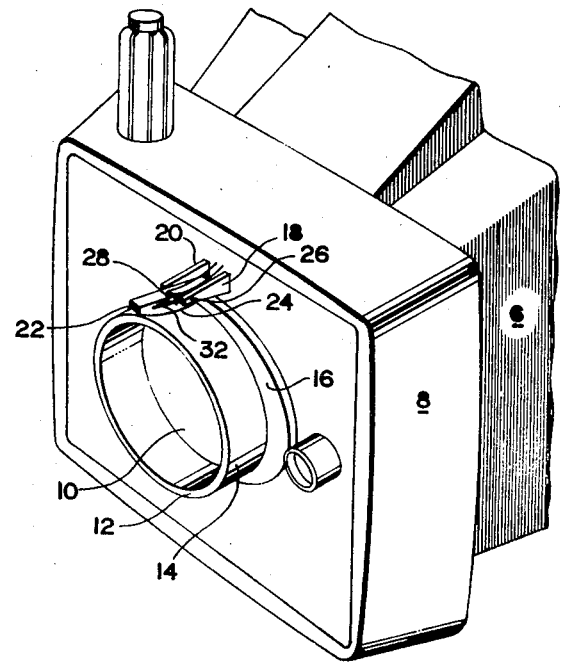
FIG. 13 provides a fragmentary perspective of the embodiment of FIG. 10 with the novel focusing mechanism thereof in an alternate position to that shown in FIG. 11.

As best seen in FIG. 13, the focusing ring 12 is rotated together with the cam 16 secured thereto so as to pivot the chamber 22 about the pin 26 causing the sphere 28 to move to the reference position of the contacts 88 and 90 and establish a conductive path therebetween. When the focusing ring 12 has been adjusted to bring the sphere 28 into contact with the contacts 88 and 90, the lens 10 will be properly focused for the range of the particular subject 66.

Figure 14:
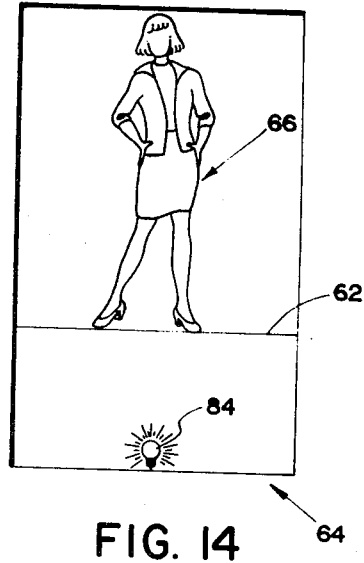
FIG. 14 provides a plan of the image visible in the viewfinder in the embodiment of FIG. 10 when a novel focusing apparatus thereof is positioned as illustrated in FIG. 13.

As best seen in FIG. 14, it will be readily apparent to the operator when the proper focus has been established for the lens 10 in that the image he sees in the viewfinder 42 will be that of the subject 66 standing just above the fiducial mark 62 and with the lamp in the lower portion of the image energized.

Thus, the operator will be able to tell when proper focus has been established at the same time as he views the subject to be photographed. As in the case of the embodiments illustrated in FIGS. 1 – 7, the cam 16 is suitably positioned and shaped such that, with the fiducial mark 62 lined up with the intersection of the subject and the base plane upon which operator is standing, the sphere 28 will be coincident with the contacts 88 and 90 whenever the lens 10 is properly focused for the range of the subject, and the lamp will light.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is, therefore, to be understood that within the scope of the appended claims the instant invention may be practised in a manner otherwise than is specifically described herein.

What is claimed is:

1. In combination with a camera having a housing, a viewfinder secured thereto, a lens, and a rotatable focusing ring for varying the focus of said lens; means for focusing said lens with respect to a remote subject, including:
  a chamber;
  gravity responsive means structurally independent of and moveably disposed within said chamber with respect to a reference indication so as to move with respect to said reference indication in response to the declination of said camera toward a predetermined portion of said subject; and
  means operably associated with said focusing ring for simultaneously effecting coincidence between said reference indication and said gravity responsive means and bringing said remote subject into focus in response to rotation of said focusing ring.

2. Apparatus according to claim 1, further including:
  means for simultaneously viewing said subject and monitoring the relative positions of said gravity responsive means and said reference indication.

3. Apparatus in accordance with claim 2, wherein said viewing and monitoring means includes means for producing an electromagnetic signal indicative of coincidence between said gravity responsive means and said reference indication.

4. The invention as recited in claim 3, wherein said gravity responsive means comprises an electrically conductive globule and said signal producing means includes a lamp.

5. The invention according to claim 4, additionally including: a power supply; plural electrical contacts connected to said power supply and extending partially within said chamber at a predetermined position to provide a reference indication and disposed such that movement of said globule to said predetermined position will effect a conductive path between said contacts and energize said lamp.

6. The invention as related in claim 3, wherein said chamber is pivotally connected to said housing and operably connected to said coincidence effecting means so as to be pivoted thereby in response to rotation of said focusing ring.

7. The invention as stated in claim 6, wherein said coincidence effecting means includes a cam surface connected to said focusing ring and said chamber is connected to a cam follower adapted to ride on said cam surface.

8. The invention as set forth in claim 7, further including spring means for biasing said chamber and said cam follower into engagement with said cam surface.

9. The invention of claim 8, further including a fiducial mark visible through said viewing and monitoring means and adapted for alignment with a predetermined portion of the subject image visible in said viewing and monitoring means, whereby said camera will be properly positioned for focusing with respect to said remote subject.

10. Apparatus in accordance with claim 9, wherein said gravity responsive means comprises an electrically conductive globule and said signal producing means includes a lamp.

11. The combination as recited in claim 10, additionally including: a power supply; plural electrical contacts connected to said power supply and extending partially within said chamber at a predetermined position such that movement of said globule to said predetermined position will effect a conductive path between said contacts and energize said lamp.

12. In combination with a camera having a housing and a focusable lens, means for focusing said lens with respect to a remote subject, including:
  a chamber;
  gravity responsive means structurally independent of and moveably disposed within said chamber with respect to a reference and moveable in response to the declination of said camera toward a predetermined portion of said subject; and
  means for simultaneously effecting coincidence between said reference and said gravity responsive means and focusing said lens with respect to said remote subject.

13. The invention of claim 12, wherein said gravity responsive means comprises an electrically conductive globule and further including means for providing an electromagnetic signal indicative of coincidence between said electrically conductive globule and said reference.

14. Apparatus in conformity with claim 13, wherein said reference comprises plural electrical contacts disposed partially within said chamber and said electromagnetic signal providing means includes a power supply and a lamp serially connected with said plural contacts.

15. The combination as related in claim 12, further including means for simultaneously viewing said subject and monitoring the relative positions of said gravity responsive means and said reference.

16. The invention as stated in claim 15, further including a fiducial mark visible through said viewing and monitoring means and adapted for alignment with a predetermined portion of the image visible in said viewing and monitoring means, whereby said camera will be properly positioned for focusing with respect to a predetermined portion of said remote subject.

17. Apparatus in accordance with claim 16, wherein said chamber is filled with a fluid and said gravity responsive means comprises a bubble.

18. Apparatus according to claim 16, wherein said gravity responsive means comprises a globule.

19. The invention as delineated in claim 16, additionally including a rotatable focusing ring having a bezel surface and operatively connected to said lens for adjusting the focus thereof.

20. The invention as recited in claim 19, wherein said reference comprises a line disposed along said bezel surface and wherein said chamber is transparent and is connected to said housing over said bezel whereby said reference will be visible therethrough.

21. The combination as set forth in claim 20, wherein said reference line is of precisely predetermined spiral shape such that rotation of said focusing ring to establish coincidence between said gravity responsive means and said reference will bring said remote subject into proper focus for the creation of a photographic image thereof.

22. The invention as related in claim 21, wherein the pitch and axial displacement of said spiral shape reference line are a function of the range of said subject.

23. The combination set forth in claim 22, wherein said chamber is filled with a transparent fluid and said gravity responsive means comprises a bubble.

24. The combination as related in claim 22, wherein said chamber is filled with a transparent fluid and said gravity responsive means comprises a globule.

25. Apparatus in accordance with claim 12, wherein said chamber is hinged to said housing and operably connected to said coincidence effecting means so as to pivot in response to actuation thereof.

26. The invention as related in claim 25, wherein said chamber is transparent and said reference comprises an index mark fixedly positioned along one surface of said chamber.

27. The invention as recited in claim 26, wherein said coincidence effecting means includes a cam and said chamber is operatively connected to said cam so as to pivot about said hinge in response to movement of said cam.

28. The invention as set forth in claim 27, further including spring means connected to said chamber for biasing same into engagement with said cam.

29. Apparatus in conformity with claim 19, wherein said chamber is hinged to said housing and further including cam means connected to said bezel surface and rotatable therewith and spring means connected to said chamber for biasing same into engagement with said cam means whereby said chamber will be caused to follow the surface of said cam in response to rotation of said focusing ring.

30. Apparatus according to claim 29, wherein said chamber is transparent and said reference comprises an index mark on one surface of said chamber.

31. The apparatus of claim 30, wherein said chamber is filled with a transparent fluid and said gravity responsive means comprises a bubble.

32. The invention as related in claim 30, wherein said chamber is filled with a transparent fluid and said gravity responsive means comprises a globule which always seeks the lowest point in said chamber.

33. Apparatus for determining the range of a subject, including:
a chamber;
gravity responsive means structurally independent of and moveably disposed within said chamber with respect to a reference position so as to move away from said reference position in response to the declination of said apparatus toward a predetermined point on said subject;
means for rotating said chamber about a predetermined axis an amount sufficient to establish coincidence between said gravity responsive means and said reference position; and
means operably connected to said rotating means and moveable therewith an amount indicative of the angle traversed by said chamber in returning said gravity responsive means to said reference position said angle being a function of the distance between said apparatus and said predetermined point.

34. Apparatus according to claim 33, further including viewfinder means for simultaneously viewing said subject and monitoring the position of said gravity responsive means.

35. The invention as set forth in claim 34, wherein said means for rotating said chamber includes a cam rotatably mounted about an axis for rotation in a plane parallel to said predetermined axis.

36. Apparatus in accordance with claim 35, wherein said viewfinder means includes:
a housing having a viewfinder lens at one end thereof and an eye lens at the other end thereof;
reflecting means positioned to reflect an image of said gravity responsive means toward said viewfinder; and
a prismatic refracting portion included within said viewfinder lens, said portion receiving the reflected image of said gravity responsive means and directing said image to said eye lens.

37. The invention as described in claim 33, wherein said chamber is filled with a fluid and said gravity responsive means includes a bubble or the like disposed within said fluid.

38. The invention as delineated in claim 33, wherein said gravity responsive means includes a ball and further including a fluid disposed within said chamber for damping the movement of said ball and having a lower specific gravity than said ball.

39. The invention of claim 33, wherein said gravity responsive means includes a globule of electrically conductive material disposed within said chamber and further including:
a power supply;
plural electrical contacts secured at least partially within said chamber at said reference position and connected to said power supply; and
current indicating means connected between said power supply and at least one of said plural electrical contacts whereby rotation of said chamber an amount sufficient to return said globule to said reference position will effect an electrically conductive path between said contacts and cause an electrical current to flow through said current indicating means.

40. The invention as recited in claim 39, wherein said chamber is filled with an electrically non-conductive fluid.

41. Apparatus in accordance with claim 40, wherein said current indicating means comprises lamp means for emitting visible radiation in response to an electrical potential applied thereacross.

42. The invention according to claim 39, further including viewfinder means for simultaneously viewing said subject and said current indicating means.

43. The invention as delineated in claim 41, further including viewfinder means for simultaneously viewing said subject and said lamp means.

44. A method for determining the range of a subject via a chamber having moveable gravity responsive means located therein, at a predetermined reference position when said chamber is level, and structurally independent of said chamber, including the steps of:
positioning said chamber within a predetermined elevation range with respect to a reference plane;
aiming said chamber at a point on said reference plane coincident with said subject so as to cause said gravity responsive means to move from said reference position; and
rotating said chamber about a predetermined axis an amount sufficient to return said gravity responsive means to said reference position the amount of such rotation being an indication of the horizontal range between said chamber and said point.

45. The method of claim 44, wherein the declination between said chamber and said point is such that aiming said chamber thereat will effect movement of said gravity responsive means away from said reference position by an amount limited solely by the size of said chamber.

46. In combination with a camera having a housing, viewfinder apparatus secured thereto, focusing means, a chamber hinged to said housing and containing gravity responsive means moveable with respect to a reference position and means operably connecting said focusing means and said chamber; a method of focusing on a remote subject, including the steps of:
positioning said camera within a known elevation range with respect to a reference plane;
sighting a point through said viewfinder common to said subject and said reference plane and thereby causing said gravity responsive means to move from said reference position an amount limited solely by the geometry of said chamber; and
rotating said chamber about said hinge by changing the focus of said camera until said gravity responsive means is returned to said reference position to thereby focus said camera at said point.

* * * * *